(12) United States Patent
Kanai

(10) Patent No.: US 11,249,666 B2
(45) Date of Patent: Feb. 15, 2022

(54) STORAGE CONTROL APPARATUS

(71) Applicant: FUJITSU LIMITED, Kawasaki (JP)

(72) Inventor: Hideyuki Kanai, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 245 days.

(21) Appl. No.: 16/177,750

(22) Filed: Nov. 1, 2018

(65) Prior Publication Data

US 2019/0179556 A1    Jun. 13, 2019

(30) Foreign Application Priority Data

Dec. 7, 2017    (JP) .............................. JP2017-235447

(51) Int. Cl.
*G06F 3/06* (2006.01)

(52) U.S. Cl.
CPC ............ *G06F 3/0641* (2013.01); *G06F 3/065* (2013.01); *G06F 3/0608* (2013.01); *G06F 3/0658* (2013.01); *G06F 3/0661* (2013.01); *G06F 3/0673* (2013.01)

(58) Field of Classification Search
CPC ...... G06F 3/0641; G06F 3/0661; G06F 3/065; G06F 3/0673; G06F 3/0608; G06F 3/0658

See application file for complete search history.

(56) References Cited

U.S. PATENT DOCUMENTS

| 5,790,773 | A | 8/1998 | Dekoning et al. |
| 2014/0281360 | A1* | 9/2014 | Danilak .................. G06F 3/065 |
| | | | 711/206 |

FOREIGN PATENT DOCUMENTS

| JP | 9-231016 | 9/1997 |
| JP | 2011-113293 | 6/2011 |
| JP | 2016-167212 | 9/2016 |

* cited by examiner

*Primary Examiner* — Cheyne D Ly
(74) *Attorney, Agent, or Firm* — Fujitsu Patent Center

(57) ABSTRACT

A storage control apparatus includes a processor that creates a snapshot of a first volume of a storage device. The processor deduplicates unupdated data among data of the first volume. The processor compresses the deduplicated data to create compressed data. The processor stores the compressed data in a second volume of the storage device. The processor selects, when the snapshot is created for two or more generations, the second volume corresponding to each of a plurality of snapshots of generations earlier than a predetermined generation. The processor detects unpopular data from the compressed data existing in the selected second volume based on a reference count. The processor collects and decompresses detected pieces of the unpopular data when the number of the detected pieces of the unpopular data is equal to or more than a predetermined threshold value. The processor combines and recompresses the decompressed data to create recompressed data.

8 Claims, 15 Drawing Sheets

US 11,249,666 B2

STORAGE CONTROL APPARATUS

CROSS-REFERENCE TO RELATED APPLICATION

This application is based upon and claims the benefit of priority of the prior Japanese Patent Application No. 2017-235447, filed on Dec. 7, 2017, the entire contents of which are incorporated herein by reference.

FIELD

The embodiments discussed herein are related to a storage control apparatus.

BACKGROUND

A storage system includes a memory device such as a hard disk drive (HDD) or a solid state drive (SSD) and a server for controlling the memory device, and records and manages a large amount of data that are handled in an information processing.

In addition, a snapshot technology of a copy-on-write method is widely used in the storage system. The snapshot technology creates the state of data of a copy source volume on the storage at a specific time point, as a snapshot. By creating and holding the snapshot, the efficiency of data operation such as a backup may be implemented.

Meanwhile, the data accumulated in the storage remarkably increases with, for example, the increase of data handled in a business or the distribution of the virtual environment. Thus, a technology has been developed for suppressing the increase of the storage capacity.

Related technologies are disclosed in, for example, Japanese Laid-open Patent Publication Nos. 2011-113293, H09-231016, and 2016-167212.

SUMMARY

According to an aspect of the present invention, provided is a storage control apparatus including a memory and a processor coupled to the memory. The processor is configured to create a snapshot of a first volume of a storage device. The processor is configured to deduplicate unupdated data among data of the first volume. The processor is configured to compress the deduplicated data to create compressed data. The processor is configured to store the compressed data in a second volume of the storage device. The processor is configured to select, when the snapshot is created for two or more generations, the second volume corresponding to each of a plurality of snapshots of generations earlier than a predetermined generation. The processor is configured to detect unpopular data from the compressed data existing in the selected second volume based on a reference count of the compressed data. The reference count is a number of references to the compressed data made from logical addresses of the selected second volume and created as a result of the deduplication. The processor is configured to collect and decompress detected pieces of the unpopular data when the number of the detected pieces of the unpopular data is equal to or more than a predetermined threshold value. The processor is configured to combine and recompress the decompressed data to create recompressed data.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

With the increase of data accumulated in the storage, snapshots are also created for several generations. However, as the number of snapshot generations increases, the data accumulated at the time of creating the snapshots also increases, and as a result, the storage consumption capacity increases.

Hereinafter, embodiments of the present disclosure will be described with reference to the accompanying drawings.

First Embodiment

Figure 1:
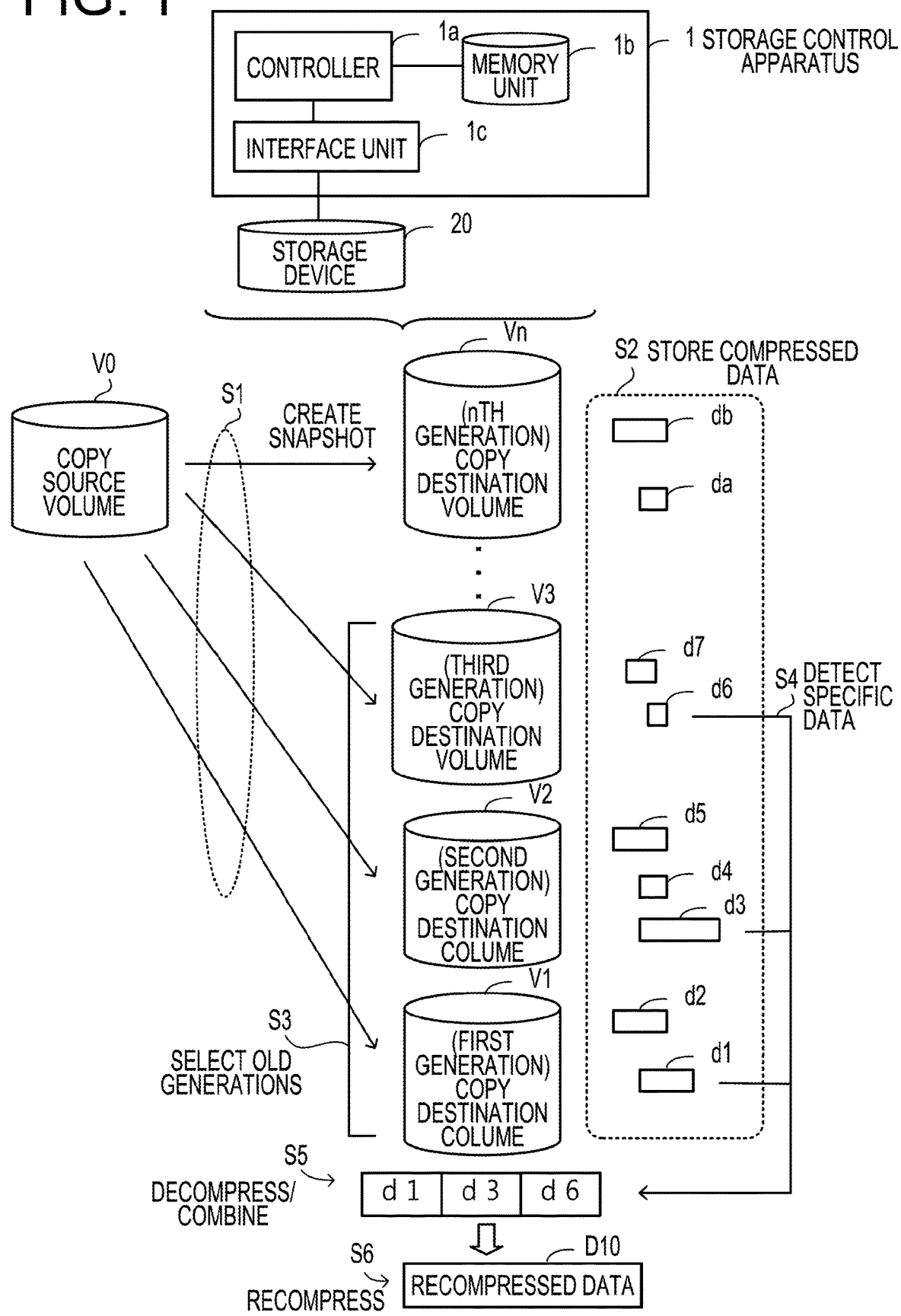
FIG. 1 is a view illustrating an example of a configuration of a storage control apparatus.

A first embodiment will be described using FIG. 1. FIG. 1 is a view illustrating an example of a configuration of a storage control apparatus. A storage control apparatus 1 is connected to a storage device 20 such as an HDD or an SSD. The storage control apparatus 1 includes a controller 1a, a memory unit 1b, and an interface unit 1c.

The interface unit 1c is connected to the storage device 20 to perform a control of an interface with the storage device 20. The controller 1a creates a snapshot of a first volume of the storage device 20, deduplicates unupdated data among the data of the first volume, compresses the deduplicated data to create compressed data, and stores the compressed data in a second volume of the storage device 20.

When the snapshot is created for two or more generations, the controller 1a selects second volumes of multiple snapshots of generations earlier than a predetermined generation. Further, the controller 1a detects specific data, from the compressed data existing in the selected second volumes, based on a reference count which is the number of references made from logical addresses of the corresponding second volumes and created as a result of the deduplication.

Then, when the number of the detected pieces of specific data is equal to or more than a predetermined threshold value, the controller 1a collects, decompresses, and combines the detected pieces of specific data and recompresses the combined data so as to create recompressed data. The memory unit 1b temporarily stores the decompressed data or stores, for example, control information on the overall control of the storage control apparatus 1.

This operation will be described using the example illustrated in FIG. 1.

(Step S1) The controller 1a creates a snapshot of a copy source volume V0 (the first volume) of the storage device 20.

(Step S2) When an update occurs in the copy source volume V0 and unupdated data is deduplicatable, the controller 1a deduplicates the unupdated data. Then, the controller 1a compresses the deduplicated data to create compressed data, and stores the compressed data in copy destination volumes V1, . . . , and Vn (second volumes) of the storage device 20.

In the example of FIG. 1, since snapshots of "n" generations are created, the copy destination volumes V1, . . . , and Vn are created for the "n" respective generations. In addition, compressed pieces of data d1 and d2 are stored in the copy destination volume V1, and compressed pieces of data d3, d4, and d5 are stored in the copy destination volume V2. Further, compressed pieces of data d6 and d7 are stored in the copy destination volume V3, and compressed pieces of data da and db are stored in the copy destination volume Vn.

(Step S3) With respect to the snapshots created for the "n" generations, the controller is selects copy destination volumes of multiple snapshots of old generations earlier than a predetermined generation. In the example of FIG. 1, when the predetermined generation is set to a fourth generation, the copy destination volumes V1, V2, and V3 of the first, second, and third generations, respectively, which are earlier than the fourth generation are selected.

(Step S4) The controller is detects specific data, from the compressed pieces of data d1, . . . , and d7 existing in the selected copy destination volumes V1, V2, and V3, based on the reference count which is the number of references made from the logical addresses of the copy destination volumes V1, V2, and V3.

In the example of FIG. 1, the compressed data d1 in the copy destination volume V1, the compressed data d3 in the copy destination volume V2, and the compressed data d6 in the copy destination volume V3 are detected as the specific data. The details of the detection of the specific data will be described later.

(Step S5) The controller 1a determines whether the number of the detected pieces of specific data is equal to or more than a predetermined threshold value, and when it is determined that the number of the detected pieces of specific data is equal to or more than the predetermined threshold value, the controller 1a collects, decompresses, and combines the detected pieces of specific data. In the example of FIG. 1, it is assumed that the three specific pieces of data d1, d3, and d6 are equal to or more than the predetermined threshold value (a predetermined number). Accordingly, the controller 1a collects the specific pieces of data d1, d3, and d6, and decompresses and combines the collected pieces of data d1, d3, and d6.

(Step S6) The controller 1a recompresses the combined data to create a single piece of recompressed data D10. The recompressed data D10 is stored in, for example, the storage device 20.

In this way, the storage control apparatus 1 detects the specific data based on the reference count which is the number of references made from the logical addresses of the respective copy destination volumes of the multiple snapshots of the old generations earlier than the predetermined generation, and when the number of the detected pieces of specific data is equal to or more than the predetermined threshold value, the storage control apparatus 1 collects, decompresses, combines, and recompresses the detected pieces of specific data. As a result, the storage control apparatus 1 may increase the compression rate and improve the saving of the storage consumption capacity even when the number of snapshot generations increases.

Second Embodiment

Figure 2:
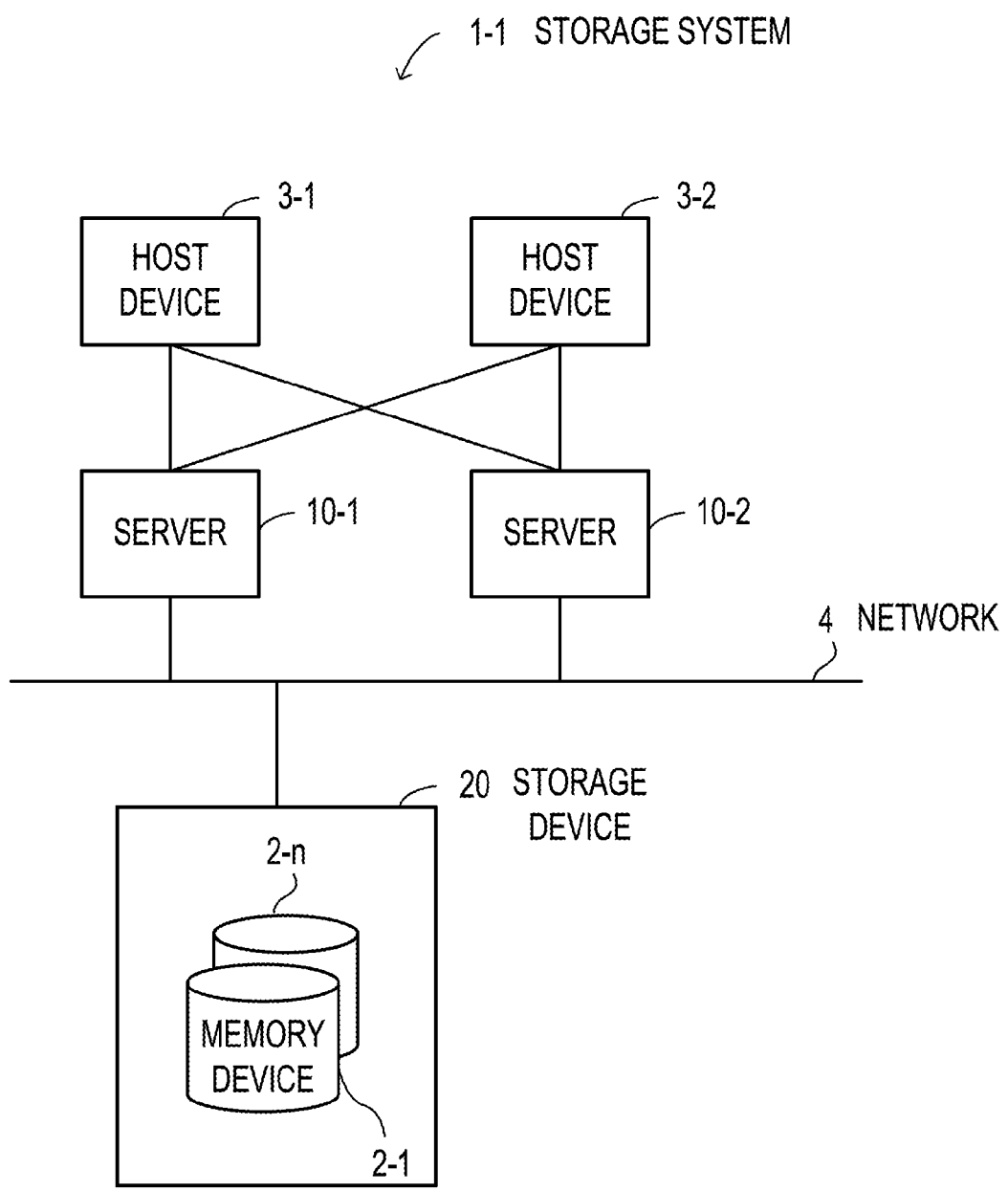
FIG. 2 is a view illustrating an example of a configuration of a storage system.

Subsequently, a second embodiment will be described. First, a system configuration will be described. FIG. 2 is a view illustrating an example of a configuration of a storage system. A storage system 1-1 includes servers 10-1 and 10-2, a storage device 20, and host devices 3-1 and 3-2, and has a redundant configuration. In addition, the storage device 20 includes memory devices 2-1, . . . , and 2-n.

Each of the host devices 3-1 and 3-2 is connected to the servers 10-1 and 10-2. The servers 10-1 and 10-2 are connected to the storage device 20 via a network 4. In addition, the servers 10-1 and 10-2 may be directly connected to the storage device 20 via a device such as a connector, rather than the network 4.

Each of the servers 10-1 and 10-2 has the function of the storage control apparatus 1 of FIG. 1, and performs a data input/output (IO) control on the memory devices 2-1, . . . , and 2-n in the storage device 20.

That is, the servers 10-1 and 10-2 perform the data IO control on the memory devices 2-1, . . . , and 2-n based on requests for data reading (read IO) and data writing (write IO) from the host devices 3-1 and 3-2.

Each of the memory devices 2-1, . . . , and 2-n is connected to both of the servers 10-1 and 10-2 so as to be shared between the servers 10-1 and 10-2. In addition, the memory devices 2-1, . . . , and 2-n are HDDs or SSDs, which are provided in a disk array form by the redundant array of inexpensive disks (RAID) structure so that the fault resistance and the availability are secured.

In the following descriptions, the servers 10-1 and 10-2 may be collectively referred to as the server 10, and the host devices 3-1 and 3-2 may be collectively referred to as the host device 3. In addition, the memory devices 2-1, . . . , and 2-n may be collectively referred to as the memory device 2.

(Hardware Configuration)

Figure 3:
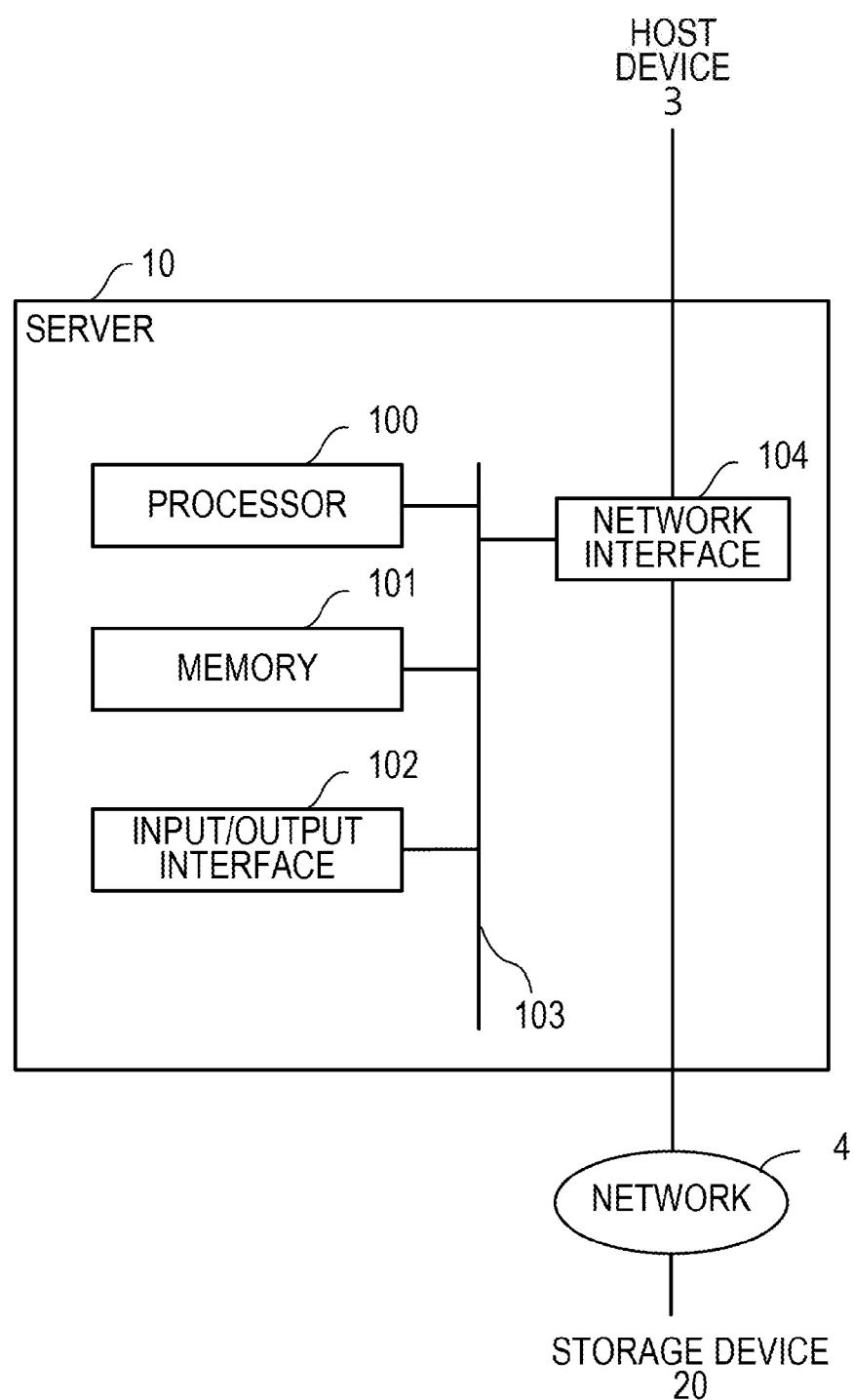
FIG. 3 is a view illustrating an example of a hardware configuration of a server.

FIG. 3 is a view illustrating an example of a hardware configuration of the server. The server 10 is entirely controlled by a processor 100. That is, the processor 100 functions as a controller of the sever 10.

A memory 101 and multiple peripheral devices are connected to the processor 100 via a bus 103. The processor 100 may be a multiprocessor. The processor 100 is, for example, a central processing unit (CPU), a micro processing unit (MPU), a digital signal processor (DSP), an application specific integrated circuit (ASIC), or a programmable logic device (PLD). In addition, the processor 100 may be a combination of two or more of the CPU, MPU, DSP, ASIC, and PLD.

The memory 101 is used as a main memory device of the server 10. The memory 101 temporarily stores at least a portion of the operating system (OS) or an application program to be executed in the processor 100. Further, the memory 101 stores various messages necessary for the processing performed by the processor 100.

The memory 101 is also used as an auxiliary memory device of the server 10 to store the OS program, an application program, and various messages. The memory 101 may include a semiconductor memory device such as a flash memory or an SSD, or a magnetic recording medium such as an HDD, as the auxiliary memory device.

The peripheral devices connected to the bus 103 are an input/output interface 102 and a network interface 104. A monitor (e.g., light emitting diode (LED) or liquid crystal display (LCD)) is connected to the input/output interface 102 to function as a display device that displays the state of the server 10 according to a command from the processor 100.

Further, the input/output interface 102 may be connected to an information input device such as a keyboard or a mouse, so as to transmit a signal sent from the information input device to the processor 100.

The input/output interface 102 functions as a communication interface for a connection of a peripheral device. For example, the input/output interface 10 may be connected to an optical drive device that reads messages recorded on an optical disc by using, for example, a laser beam.

The optical disc is a portable recording medium on which messages are recorded to be readable by reflection of light. Examples of the optical disc include a Blu-ray disc (registered trademark), a compact disc read only memory (CD-ROM), and CD-R (recordable)/RW (rewritable).

In addition, the input/output interface 102 may be connected to a memory device or a memory reader/writer. The memory device is a recording medium having a function to communicate with the input/output interface 102. The memory reader/writer is a device that writes a message on a memory card or reads a message from the memory card. The memory card is a card type recording medium.

The network interface 104 performs a control of interface with the storage device 20 via the network 4 of FIG. 2, and thus, has the function of the interface unit 1c of FIG. 1. In this case, the network interface 104 has the function of PCIeSW (switch) that performs a drive transfer of data according to, for example, the peripheral component interconnect express (PCIe) protocol, and performs a data transfer between the processor 100 and the storage device 20.

In addition, the network interface 104 performs a control of interface with the host device 3 of FIG. 2. In this case, the network interface 104 has the functions of, for example, a network interface card (NIC) and a wireless local area network (LAN) card. For example, signals or messages received in the network interface 104 are output to the processor 100.

The processing function of the server 10 may be implemented by the hardware configuration described above. For example, the server 10 may perform the control of the present disclosure by executing programs recorded on a recording medium readable by the processor 100.

The programs describing the processing contents to be executed by the server 10 may be recorded in various recording media. For example, the programs to be executed by the server 10 may be stored in an auxiliary memory device.

The processor 100 loads at least a portion of the programs in the auxiliary memory device into the main memory device to execute the programs. In addition, the programs may be recorded on a portable recording medium such as an optical disc, a memory device, or a memory card. The programs stored in the portable recording medium are installed in the auxiliary memory device, and then, become executable, under the control from the processor 100. In addition, the processor 100 may read and execute the programs directly from the portable recording medium.

<Functional Blocks>

Figure 4:
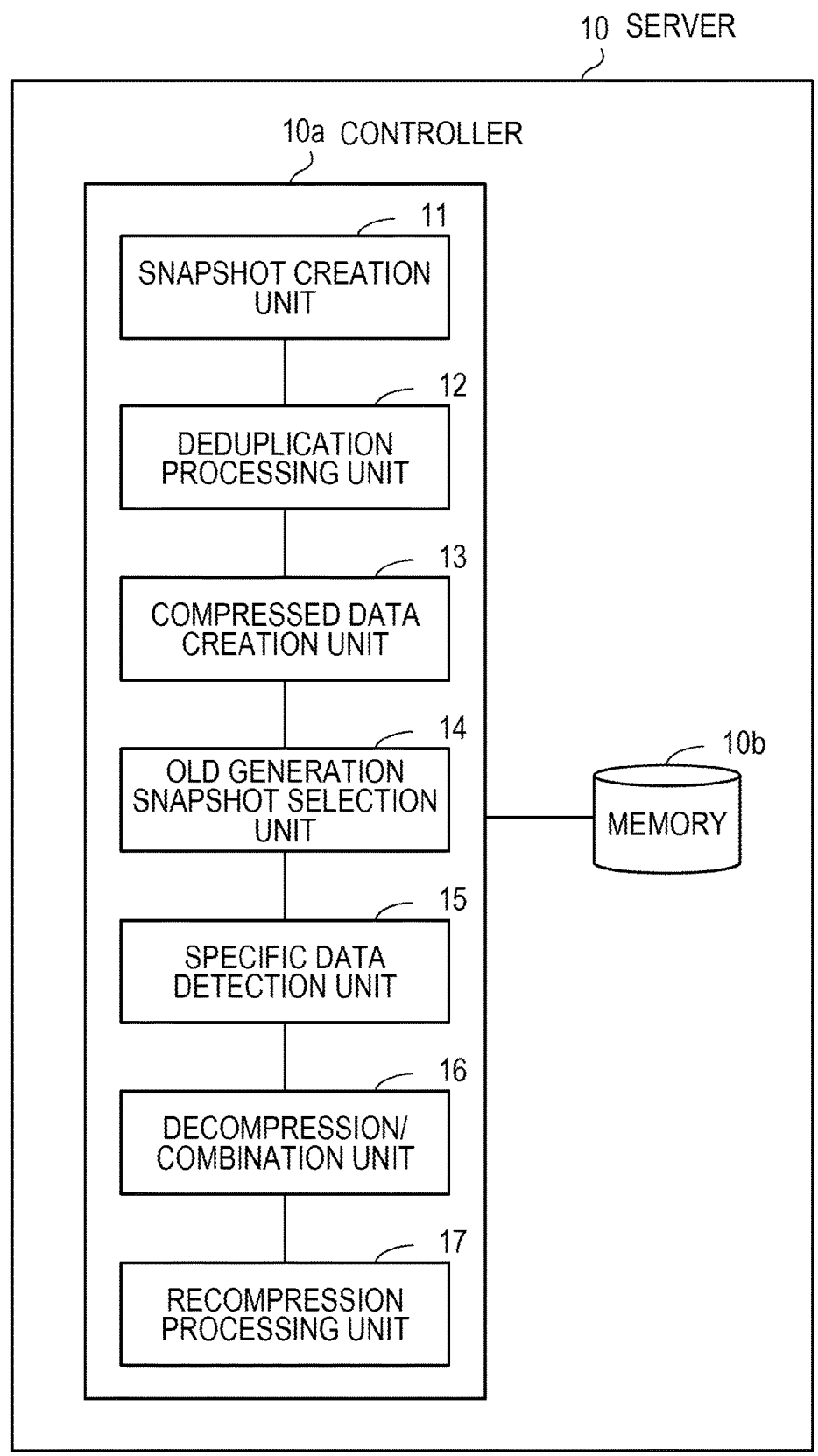
FIG. 4 is a view illustrating an example of functional blocks of the server.

FIG. 4 is a view illustrating an example of functional blocks of the server. The server 10 includes a controller 10a and a memory 10b. The controller 10a corresponds to the controller 1a of FIG. 1, and the memory 10b corresponds to the memory unit 1b of FIG. 1.

The controller 10a includes a snapshot creation unit 11, a deduplication processing unit 12, a compressed data creation unit 13, an old generation snapshot selection unit 14, a specific data detection unit 15, a decompression/combination unit 16, and a recompression processing unit 17.

The snapshot creation unit 11 creates a snapshot of the copy source volume of the storage device 20. When an update occurs in the copy source volume and unupdated data is deduplicatable, the deduplication processing unit 12 deduplicates the unupdated data.

The compressed data creation unit 13 compresses the deduplicated data to create compressed data, and stores the compressed data in a copy destination volume of the storage device 20. With respect to the snapshots created for multiple generations, the old generation snapshot selection unit 14 selects copy destination volumes of multiple snapshots of old generations earlier than the predetermined generation.

The specific data detection unit 15 detects specific data, from the compressed data existing in the selected copy destination volumes, based on the reference count which is the number of references made from the logical addresses of the copy destination volumes. When the number of the detected pieces of specific data is equal to or more than the predetermined number, the decompression/combination unit 16 collects, decompresses, and combines the detected pieces of specific data. The recompression processing unit 17 performs the recompression after the combination to create recompressed data.

In addition, the controller 10a is implemented by the processor 100 illustrated in FIG. 3. In addition, the memory 10b is implemented by the memory 101 illustrated in FIG. 3.

<Deduplication Operation>

Figure 5:
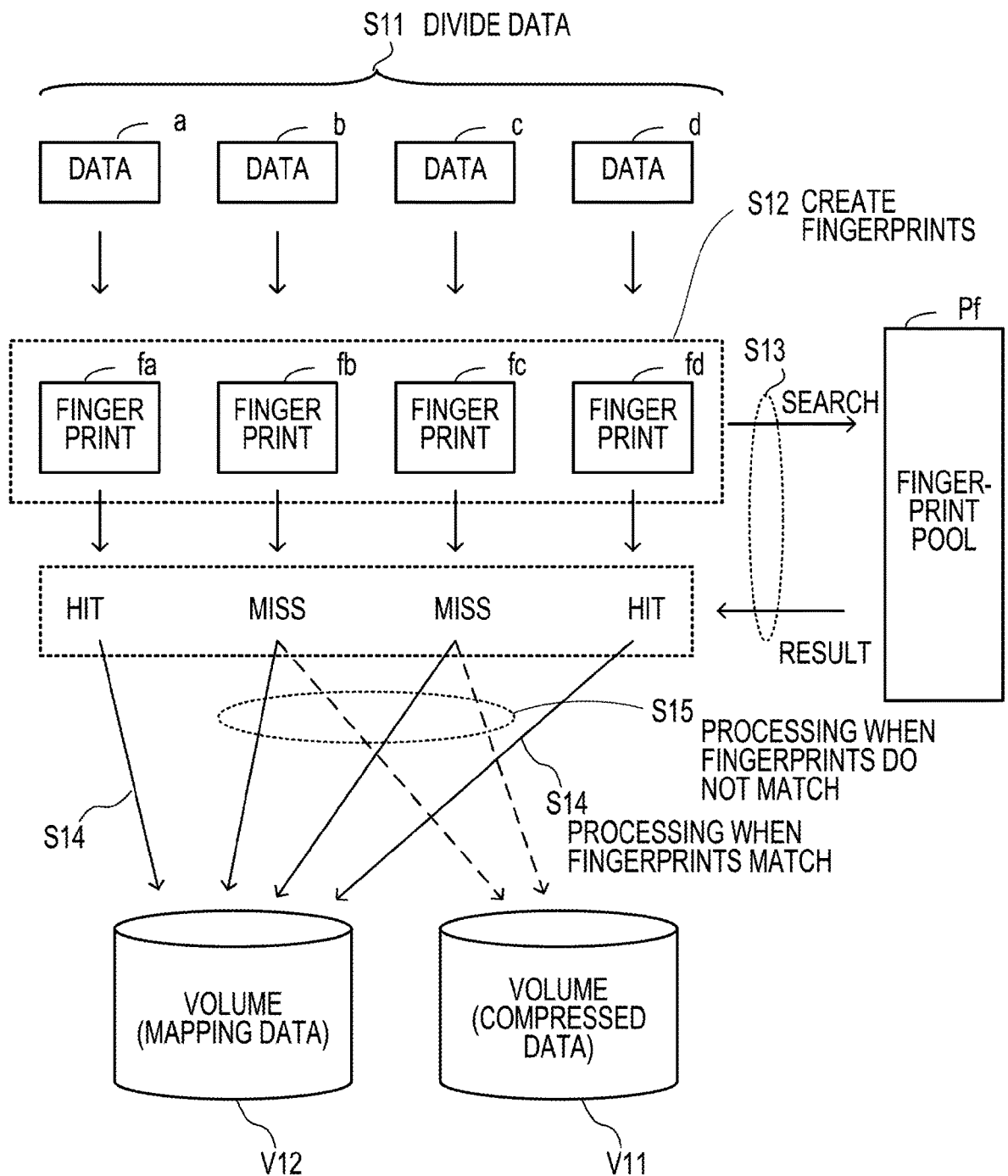
FIG. 5 is a view for explaining a deduplication operation.

FIG. 5 is a view for explaining an example of the deduplication operation.

(Step S11) Upon receiving data of a write request transmitted from the host device 3, the controller 10a divides the data into pieces of data a, b, c, and d having a fixed length.

(Step S12) The controller 10a creates fingerprints for the pieces of data a, b, c, and d. A fingerprint is, for example, a hash value calculated from data, and the identity of the data is recognized by collating the hash value. In the example of FIG. 5, fingerprints fa, fb, fc, and fd are created for the pieces of data a, b, c, and d, respectively.

(Step S13) The controller 10a searches for the fingerprints fa, fb, fc, and fd from fingerprints stored in a fingerprint pool Pf (hereinafter, also referred to as set fingerprints), to compare whether the fingerprints fa, fb, fc, and fd match the set fingerprints. In addition, the fingerprint pool Pf is stored in, for example, the memory 10b illustrated in FIG. 4.

In the example of FIG. 5, the fingerprints fa and fd match the set fingerprints (HIT), and the fingerprints fb and fc do not match the set fingerprints (MISS).

(Step S14) The controller 10a does not record the data having the fingerprints that match the set fingerprints, in a volume V11 of the memory device 2, and records mapping data of the corresponding data in a volume V12 of the storage device 2 so as to update only the mapping data.

The volume V11 is a volume for storing data (the compressed data), and the volume V12 is a volume for storing the mapping data. In addition, the mapping data manages data pointed by a logical block address (LBA) of a volume to be deduplicated.

Here, in the example of FIG. 5, the fingerprints fa and fd match the set fingerprints in the fingerprint pool Pf. Accordingly, the pieces of data "a" and "d" having the fingerprints fa and fd, respectively, are not recorded in the volume V11 and are deduplicated. The mapping data of the pieces of data "a" and "d" are recorded in the volume V12, so that only the mapping data is updated.

(Step S15) The controller 10a compresses the data having the fingerprints that do not match the set fingerprints, and records the compressed data in the volume V11. Further, the controller 10a records the mapping data of the corresponding data in the volume V12 so as to update the mapping data.

In the example of FIG. 5, the fingerprints fb and fc do not match the set fingerprints in the fingerprint pool Pf. Accordingly, the pieces of data "b" and "c" having the fingerprints fb and fc, respectively, are compressed, and then, recorded in the volume V11. Further, the mapping data of the pieces of data "b" and "c" are recorded in the volume V12, so that the mapping data is updated.

In the descriptions above, the mapping data and the compressed data are retained in different volumes. However, the mapping data and the compressed data may be retained in the same volume. In addition, a volume may be a single volume or may be divided into multiple volumes. In addition, in the descriptions above, the deduplication is performed in the data write from the host device 3. However, the similar deduplication is performed in a data copy within the server 10 or a data copy between the servers.

<Creation of Snapshots and Management of Snapshot Generations>

At the time when a snapshot is created, a management region is secured on the memory device 2. In the management region, metadata including, for example, positional information of the data of the copy source volume/copy destination volume is recorded.

In addition, when an update (addition, change or deletion) occurs on the data of the copy source volume after the creation of a snapshot, the unupdated data is retracted into the management region, and metadata of the unupdated data and the updated data is also recorded in the management region. Thus, the data at the creation time of the snapshot is readable.

That is, the management region corresponds to the copy destination volume described above, and when an update occurs in the data of the copy source volume after the creation of a snapshot, the unupdated data is copied into the copy destination volume.

In this way, by combining the information accumulated in the copy destination volume (the management region) with the data of the copy source volume, it is possible to present data of a volume at a past specific time point as a snapshot, to a user.

Meanwhile, since the snapshot is regularly taken and used for a backup and others, the snapshot is created and managed for multiple generations.

Figure 6:
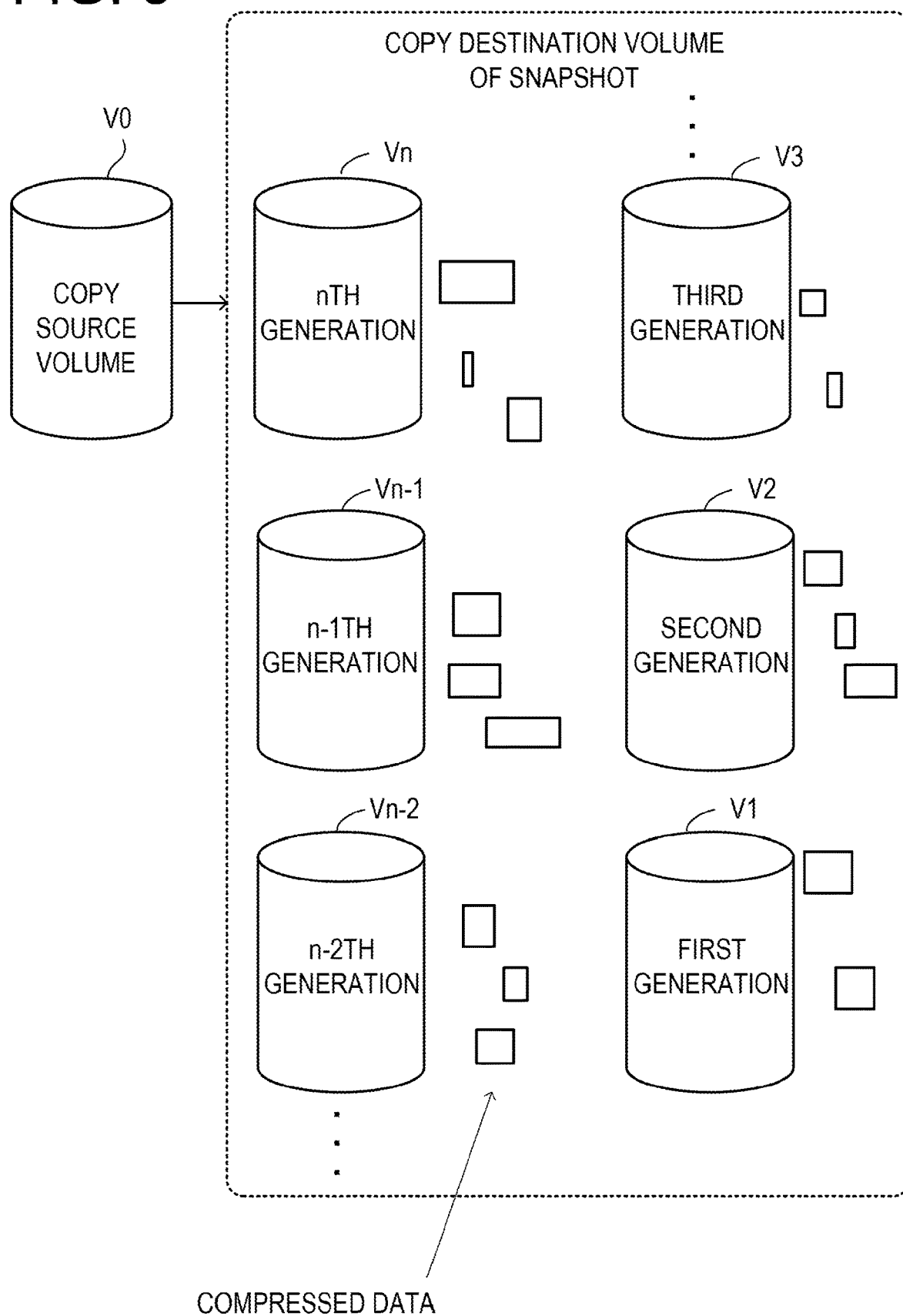
FIG. 6 is a view illustrating an example of a management of snapshot generations.

FIG. 6 is a view illustrating an example of the management of snapshot generations. The controller 10a creates a snapshot from the copy source volume V0 at a predetermined time interval, and manages the created snapshots for each generation. In the example of FIG. 6, the snapshots are created for "n" generations, and the copy destination volumes V1, . . . , and Vn of the respective generations are managed.

That is, each time a data update occurs on the copy source volume V0 for a time period from the creation of a snapshot until the creation of a snapshot of a next generation, the unupdated data is copied into a copy destination volume of a snapshot of the latest generation. That is, when a data update occurs on the data of the copy source volume V0, the unupdated data is copied into a copy destination volume.

In this copy processing, the processes of deduplication and compression illustrated in FIG. 5 operate in the copy destination volume. That is, the unupdated data is held in the copy destination volume when a data update occurs, and at this time, the unupdated data is held in the copy destination volume as data obtained by removing surplus data (redundant data) by the deduplication and compressing the deduplicated data.

In addition, FIG. 6 illustrates as if each copy destination volume of the snapshot independently holds the compressed data. However, actually, as illustrated in FIG. 5, the compressed data is stored in the volume V11, and at the accessing time, the compressed data is read according to the mapping data in the volume V12.

<Check of Reference Count of Compressed Data in Copy Destination Volumes>

In the copy destination volumes of the snapshots of the multiple old generations earlier than the predetermined generation, a check of the reference count is performed for the compressed data stored in the corresponding copy destination volumes, and the specific data is detected.

Figure 7:
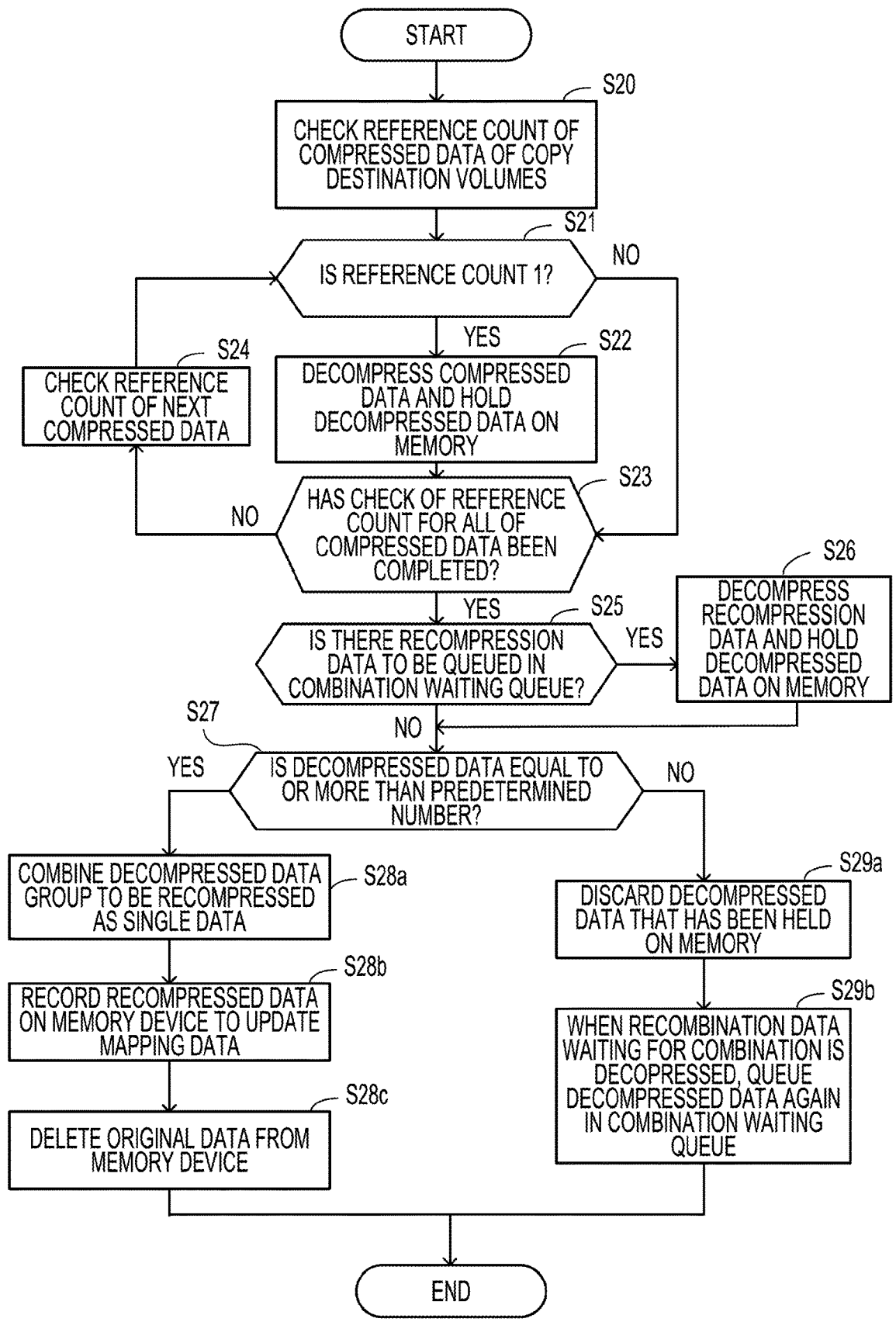
FIG. 7 is a flowchart illustrating an operation from a check of the reference count of compressed data until a recompression.

FIG. 7 is a flowchart illustrating an operation from the check of the reference count of the compressed data until the recompression.

(Step S20) When there exist a predetermined number or more of snapshots of generations earlier than the predetermined generation, the controller 10a checks the reference count to the compressed data from the LBAs of the copy destination volumes (a specific example of the reference count will be described later in FIG. 9).

(Step S21) The controller 10a determines whether the reference count is 1. When it is determined that the reference count is 1, the processing proceeds to step S22, and when it is determined that the reference count is not 1, the processing proceeds to step S23.

(Step S22) The controller 10a reads the compressed data whose reference count is 1 (corresponding to the specific data) from the copy destination volume, decompresses the compressed data, and develops and holds the decompressed data in the memory 10b.

(Step S23) The controller 10a determines whether the check of the reference count for all of the pieces of compressed data has been completed. When it is determined that the check of the reference count for all of the pieces of compressed data has been completed, the processing proceeds to step S25, and when it is determined that the check of the reference count for all of the pieces of compressed data has not been completed, the processing proceeds to step S24.

In addition, the check of the reference count is performed for all of the copy destination volumes of the snapshots of the multiple old generations selected by the controller 10*a*.

(Step S24) The controller 10*a* checks the reference count of the next compressed data. The processing returns to step S21.

(Step S25) After checking the reference count for all of the pieces of compressed data, the controller 10*a* determines whether there exists recompression data to be queued in a combination waiting queue. When it is determined that there exists recompression data to be queued in the combination waiting queue, the processing proceeds to step S26, and when it is determined that there exists no recompression data to be queued in the combination waiting queue, the processing proceeds to step S27. The combination waiting queue is included in, for example, the memory 10*b*.

(Step S26) The controller 10*a* decompresses the recompression data to be queued in the combination waiting queue, and develops and holds the decompressed data in the memory 10*b*. In addition, the processing of queuing the recompression data in the combination waiting queue and decompressing the queued recompression data will be described later with reference to FIG. 15.

(Step S27) The controller 10*a* determines whether the decompressed data reaches a predetermined number or more. When it is determined that the decompressed data reaches the predetermined number or more, the processing proceeds to step S28*a*, and when it is determined that the decompressed data is less than the predetermined number, the processing proceeds to step S29*a*.

(Step S28*a*) When it is determined that the decompressed data reaches the predetermined number or more, the controller 10*a* combines the decompressed data group to be recompressed as a single piece of data.

(Step S28*b*) The controller 10*a* records the created recompressed data in the memory device 2 to update the mapping data.

(Step S28*c*) The controller 10*a* deletes the original data included in the original data group that was combined at the creation time of the recompressed data, from the memory device 2.

(Step S29*a*) When it is determined that the decompressed data is less than the predetermined number, the controller 10*a* discards the decompressed data that are being held in the memory 10*b*.

(Step S29*b*) When the recombination data waiting for the combination is decompressed, the controller 10*a* queues the decompressed data again in the combination waiting queue.

<Structure and Update of Mapping Data>

Figure 8:
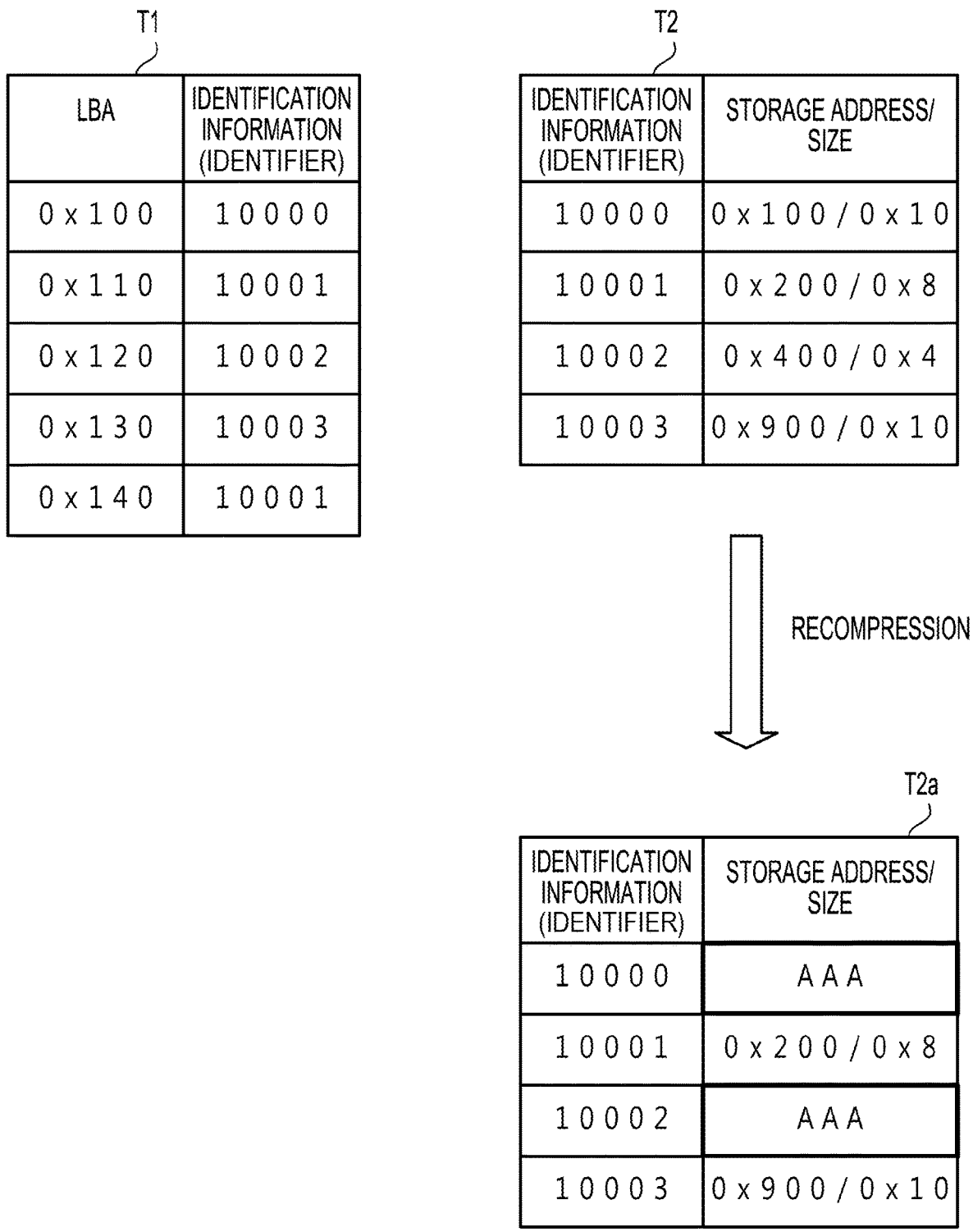
FIG. 8 is a view illustrating an example of a structure of mapping data and an update of the mapping data according to the recompression.

FIG. 8 is a view illustrating an example of a structure of the mapping data and an update of the mapping data in accordance with the recompression. The mapping data has a table structure.

A table T1 has an LBA of a volume and identification information (identifier) of data corresponding to the LBA, as items. A table T2 has identification information of data and a storage address/size which is a set of a storage address (e.g., a head address) and a size of the data, as items.

The size indicates, for example, a block count, and one block count=512 bytes (e.g., the size 0×10 is 512×10 bytes). In addition, the identification information distinguishes specific data from other different pieces of data, and for example, a fingerprint of data may be used.

Here, when the data indicated by the mapping data is recompressed, the mapping data is updated. In this case, the information registered in the storage address/size of the table T2 is removed, and instead, data ID is stored. A table T2*a* represents the state when the data is recompressed so that the mapping data is updated. In addition, the data ID is a unique value assigned to the recompressed data.

The example of FIG. 8 illustrates the updated state of the mapping data when the pieces of data mapped in LBA=0×100 and LBA=0×120 become the recompressed data with data ID=AAA.

Among the pieces of the mapping data, the storage address/size=0×100/0×10 corresponding to LBA=0×100 and the storage address/size=0×400/0×4 corresponding to LBA=0×120 are updated to the values of the data ID=AAA of the recompressed data in the table T2*a*.

<Example of Reference count>

Figure 9:
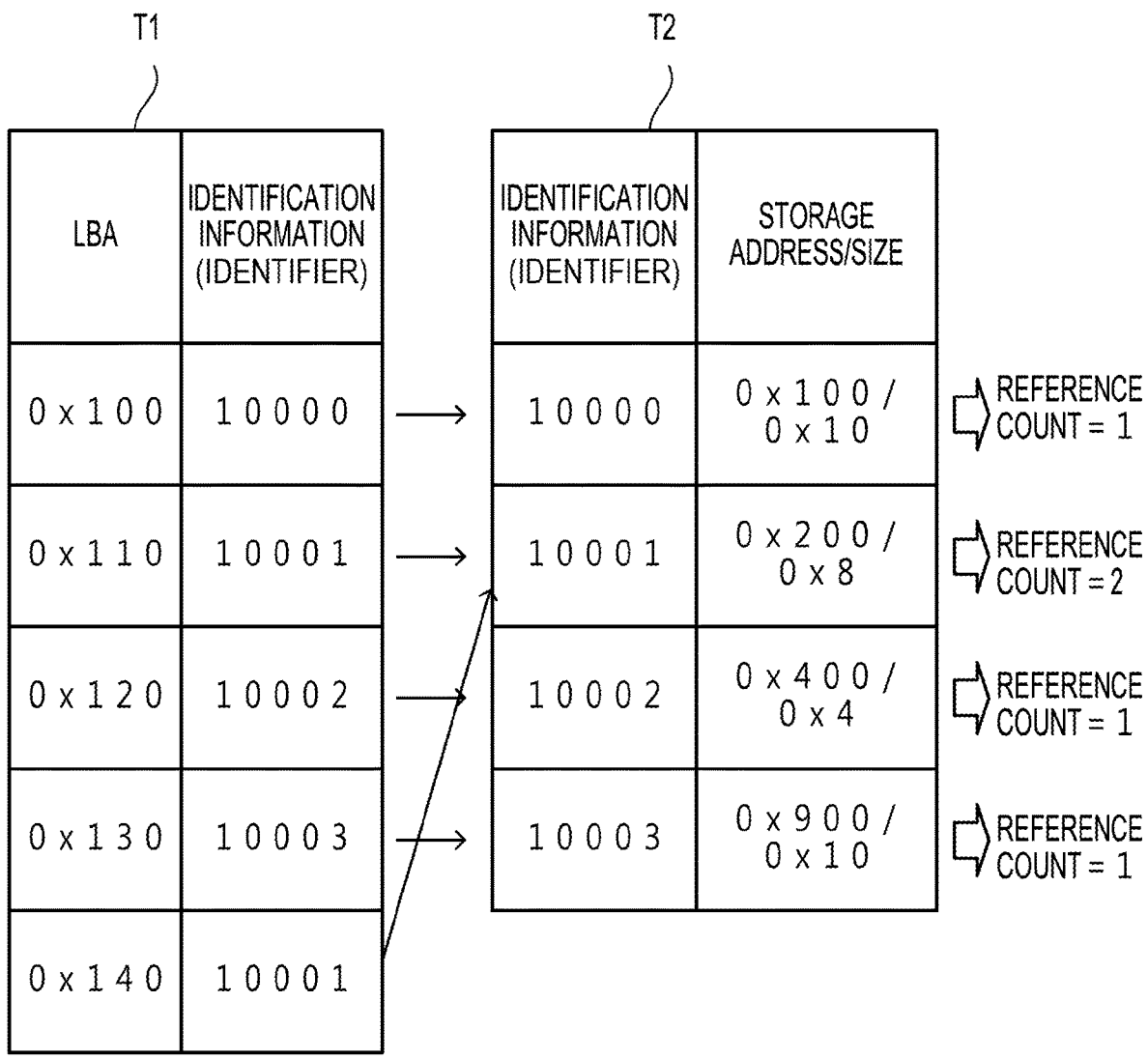
FIG. 9 is a view illustrating an example of the reference count.

FIG. 9 is a view illustrating an example of the reference count. As described above in FIG. 8, in the table T1, the LBA of each volume is associated with the identification information, and in the table T2, the identification information and the storage address/size are associated with each other. Thus, from the tables T1 and T2, it is specified where the data having the identification information is present (storage address/size), according to the identification information associated with the LBA.

Here, in the LBAs of the volumes to be deduplicated, since the identification information of LBA=0×100 is 10000, it is specified that the data having the identification information=10000 is stored in 0×100/0×10. Further, since the data having the identification information=10000 is referred to from the single LBA=0×100, the reference count in this case is 1.

In addition, since the identification information of LBA=0×120 is 10002, it is specified that the data having the identification information=10002 is stored in 0×400/0×4. Further, since the data having the identification information=10002 is referred to from the single LBA=0×120, the reference count in this case is 1.

In addition, since the identification information of LBA=0×130 is 10003, it is specified that the data having the identification information=10003 is stored in 0×900/0×10. Further, since the data having the identification information=10003 is referred to from the single LBA=0×130, the reference count in this case is 1.

Meanwhile, since the identification information of LBA=0×110 is 10001 and the identification information of LBA=0×140 is also 10001, it is specified that the data having the identification information=10001 is stored in 0×200/0×8. Further, since the data having the identification information=10001 is referred to from the two LBAs=0×110 and 0×140, the reference count in this case is 2.

The reference count may be obtained as described above. In addition, the controller 10*a* detects the specific data based on the reference count to the compressed data from the LBA of the copy destination volume.

That is, the controller 10*a* detects the compressed data whose reference count is 1 because the compressed data is referred to from the single LBA of the copy destination volume, as the specific data. In the example of FIG. 9, the pieces of data having the pieces of identification information 10000, 10002, and 10003 are detected as the specific data, since the reference count of the corresponding pieces of data=1 (the specific data is the data to be recompressed).

Meanwhile, the controller 10*a* regards the compressed data whose reference count is 2 because the compressed data is referred to from the multiple LBAs of the copy destination volumes (the data of the identification number 10001 whose reference count=2, in the example of FIG. 9), as data other than specific data, and maintains the storage in the copy destination volumes.

That is, the controller 10a does not recompress the data whose reference count is 2 or more. This is because duplicate data whose reference count is 2 or more includes data which is highly likely to be accessed soon, and thus, when the duplicate data whose reference count is 2 or more is held as recompressed data, the decompression processing may be performed soon after the holding of the recompressed data so that an access penalty is highly likely to occur. Thus, the controller 10a regards the data whose reference count is 1, as the data to be recompressed.

<Data Structures of Recompressed Data and Metadata>

Figure 10:
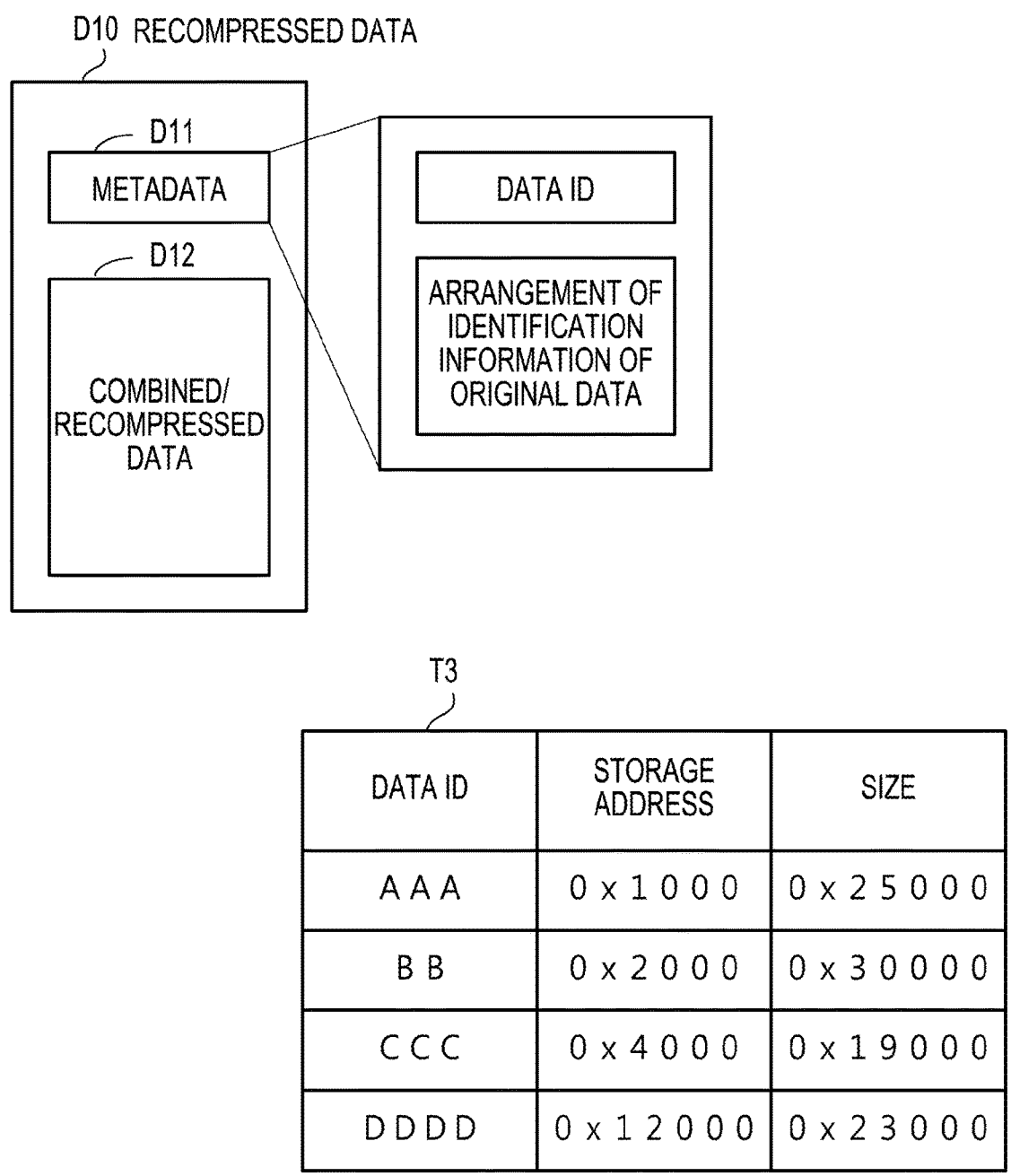
FIG. 10 is a view illustrating data structures of recompressed data and metadata.

FIG. 10 is a view illustrating data structures of the recompressed data and the metadata. The recompressed data D10 includes metadata D11, and combined/recompressed data D12 obtained when the original data group formed of multiple pieces of original data is combined and recompressed.

The metadata D11 includes data ID of the combined/recompressed data D12 and an arrangement of pieces of identification information of the individual pieces of original data included in the original data group. The arrangement of the pieces of identification information follows the order of the combination of the pieces of original data.

When specific original data is extracted from the combined/recompressed data D12, the controller 10a decompresses the combined/recompressed data D12, and then, specifies the original data from the decompressed data based on the identification information. The arrangement of the pieces of identification information follows the order of the combination, and the decompressed data has a fixed length, so that from the head address of the decompressed data and the arrangement number thereof, the original data having the corresponding identification information may be specified.

Meanwhile, with the creation of the combined/recompressed data D12, mapping data of the combined/recompressed data D12 is created and updated as a portion of the metadata D11 of the combined/recompressed data D12.

The mapping data of the combined/recompressed data D12 has a table structure as represented in a table T3. The table T3 has data ID, a storage address, and a size of the combined/recompressed data D12, as items.

The mapping data of the combined/recompressed data D12 is held on the memory 10b in the server 10 or the memory device 2 in the storage device 20, and updated each time the combined/recompressed data D12 is created or deleted.

<Operation When Read Request Is Received>

Figure 11:
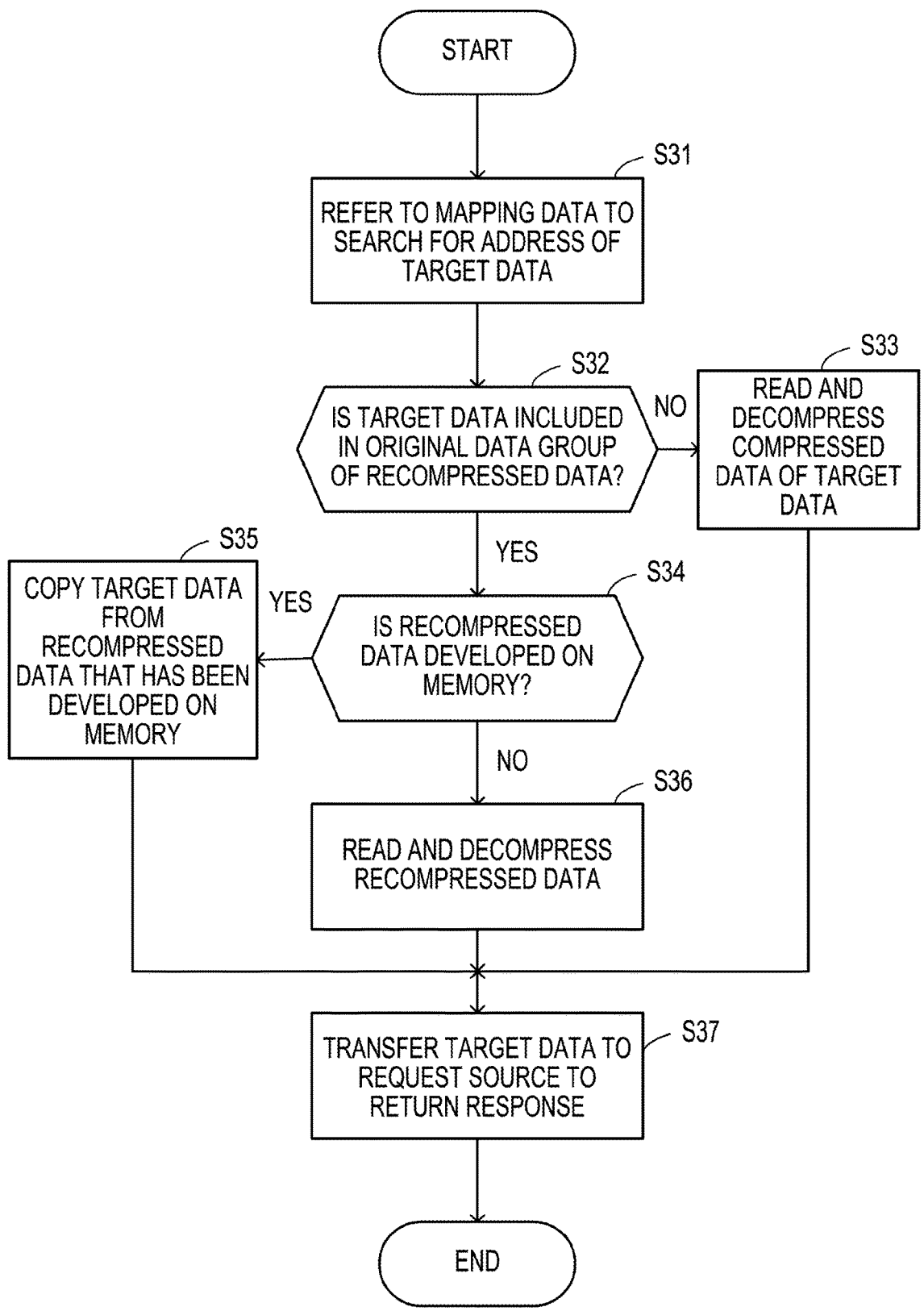
FIG. 11 is a flowchart illustrating an operation when a read request is received.

FIG. 11 is a flowchart illustrating an operation when a read request is received. The read request is issued from, for example, the host device 3 or a copy source of a cascade copy.

(Step S31) When the read request is received, the controller 10a refers to the mapping data of the volume to be read and searches for the address of the data pointed by the mapping data.

(Step S32) The controller 10a determines whether the target data (the data to be read) is included in the original data group of the recompressed data. The original data of the recompressed data refers to data identified by the identification information included in the metadata of the recompressed data. When it is determined that the target data is not included in the original data group of the recompressed data, the processing proceeds to step S33. When it is determined that the target data is included in the original data group of the recompressed data, the processing proceeds to step S34.

In addition, it is determined whether data is included in the original data group of the recompressed data, according to whether the value recorded in the storage address/size of the mapping data illustrated in FIG. 8 has been changed into the data ID.

(Step S33) When it is determined that the target data is not included in the original data group of the recompressed data, the controller 10a reads and decompresses the compressed data of the target data. The processing proceeds to step S37.

(Step S34) When it is determined that the target data is included in the original data group of the recompressed data, the controller 10a determines whether the recompressed data that includes the target data in the original data group is developed on the memory 10b. When it is determined that the recompressed data is developed on the memory 10b, the processing proceeds to step S35, and when it is determined that the recompressed data is not developed on the memory 10b, the processing proceeds to step S36.

In addition, when the recompressed data is read from the memory device 2 and decompressed, the decompressed data is developed on the memory 10b for a predetermined time. Thus, it is checked whether the recompressed data is developed on the memory, as in step S34.

(Step S35) The controller 10a copies the target data from the recompressed data that are being developed on the memory. The processing proceeds to step S37.

(Step S36) When the recompressed data including the target data in the original data group is not developed on the memory, the controller 10a reads the compressed data of the target data from the memory device 2 and decompresses the read data, based on the mapping data of the recompressed data.

(Step S37) The controller 10a transfers the target data and returns a response, to the read request source.

<Operation after Recompressed Data is Read from Memory Device 2>

Figure 12:
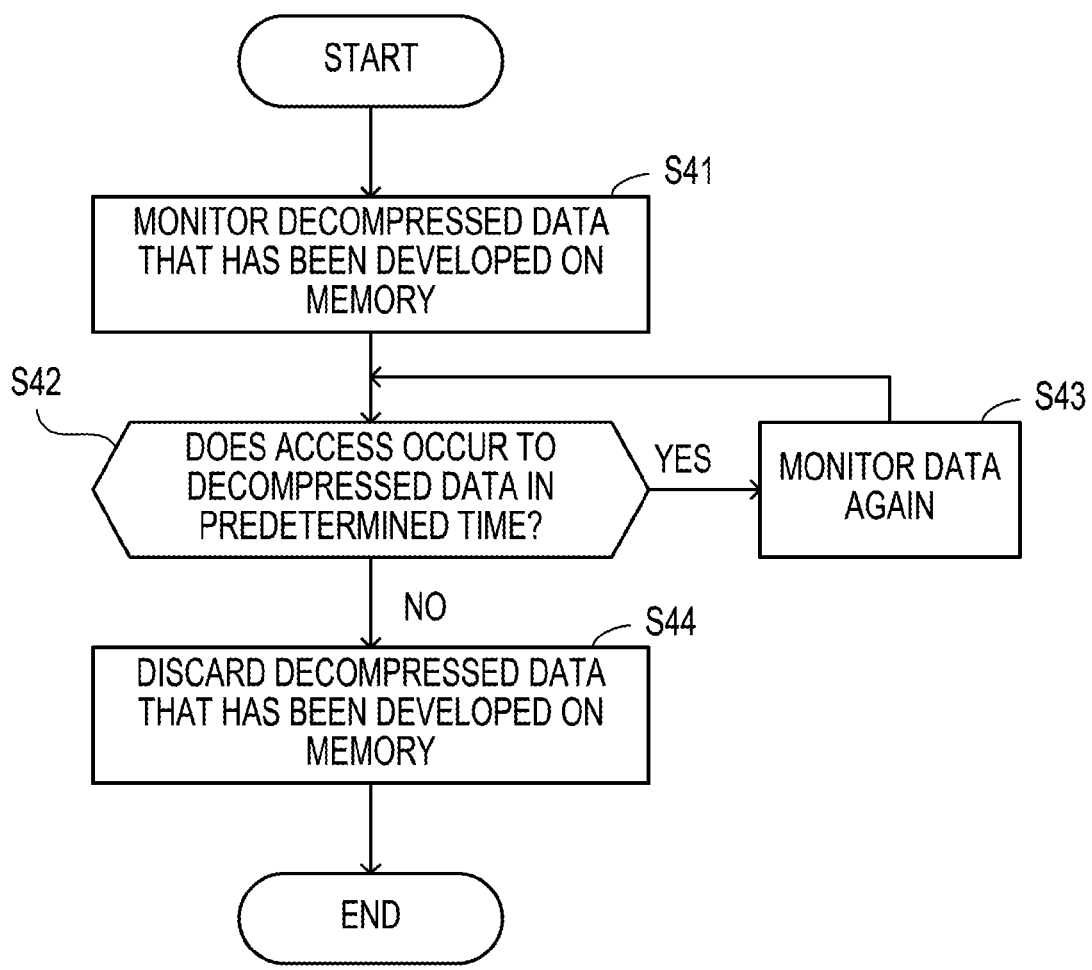
FIG. 12 is a flowchart illustrating an operation after recompressed data is read from a memory device.

FIG. 12 is a flowchart illustrating an operation after the recompressed data is read from the memory device. FIG. 12 represents an operation after the recompressed data is read from the memory device 2 and a response is returned to the request source.

The recompressed data has been decompressed in order to return a response to the request source, and the decompressed data exists on the memory 10b. In addition, since data accessed once may be accessed again soon, the decompressed data remains on the memory 10b for a predetermined time.

(Step S41) The controller 10a monitors the decompressed data that has been developed on the memory.

(Step S42) The controller 10a determines whether an access occurs to the data included in the original data group of the recompressed data in a predetermined time. When it is determined that the access occurs, the processing proceeds to step S43, and when it is determined that no access occurs, the processing proceeds to step S44.

(Step S43) When it is determined that the access occurs in the predetermined time, the controller 10a continues to keep the data remaining on the memory 10b, and the processing returns to the processing of step S42 (it is checked again whether the access occurs after an elapse of the predetermined time).

(Step S44) When it is determined that no access occurs in the predetermined time, the controller 10a discards the decompressed recompressed data that has been developed on the memory 10b. In addition, since the recompressed data itself exists on the memory device 2, the update of the mapping data of the recompressed data is unnecessary.

<Operation When Write Request is Received>

Figure 13:
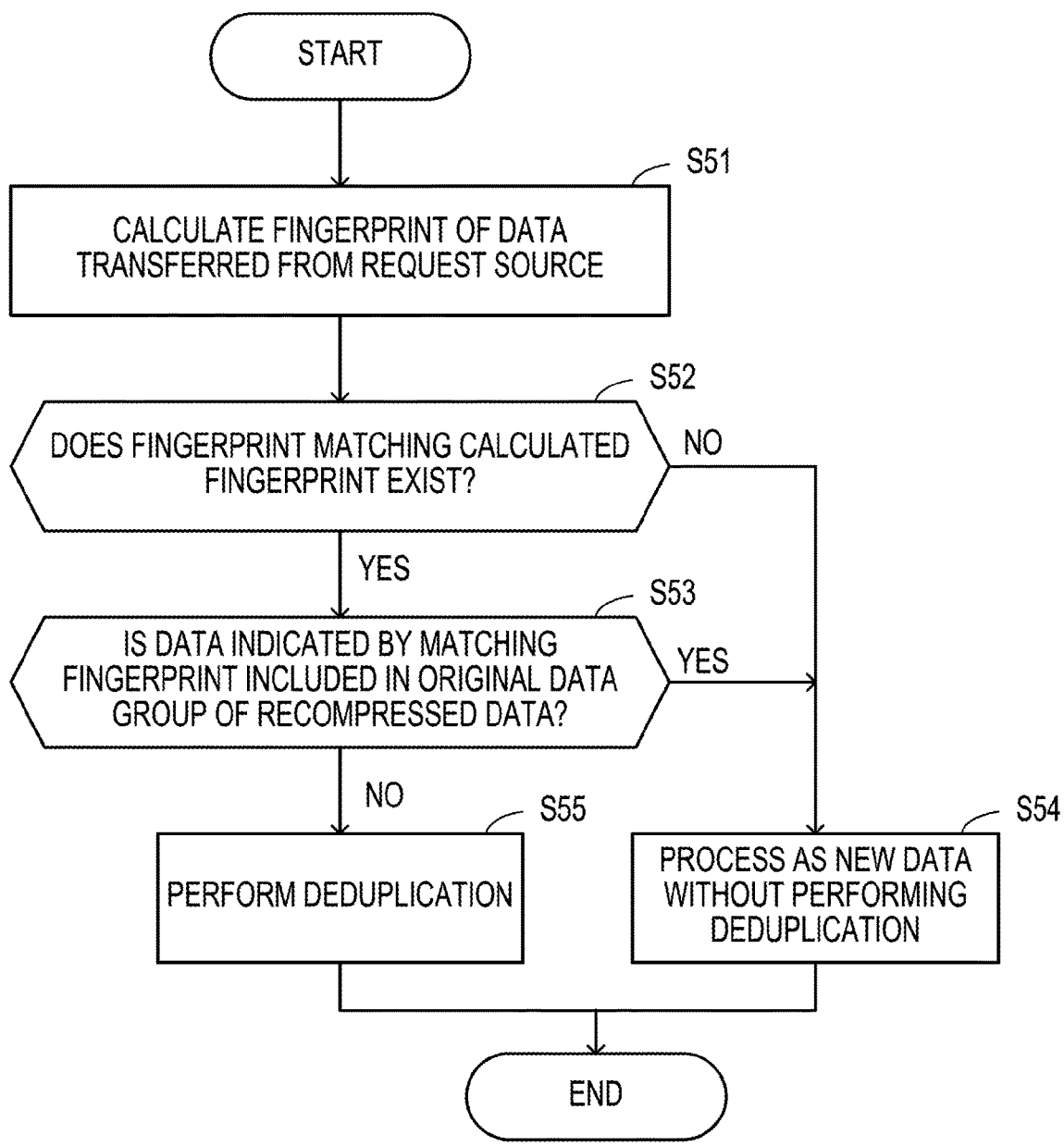
FIG. 13 is a flowchart illustrating an operation when a write request is received.

FIG. 13 is a flowchart illustrating an operation when a write request is received. The write request may be issued from the host device 3 or may be a request for a copy destination write from a different copy session.

(Step S51) When the write request is received, the controller 10a divides the data transferred from the request source into pieces of data having a fixed length, and calculates a fingerprint for each piece of the divided data.

(Step S52) The controller 10a searches whether the calculated fingerprints exist in the fingerprint pool Pf of the server 10. When the calculated fingerprints exist in the fingerprint pool Pf, the processing proceeds to step S53, and when the calculated fingerprints do not exist in the fingerprint pool Pf, the processing proceeds to step S54.

(Step S53) The controller 10a determines whether the data pointed to by the same fingerprints is included in the original data group of the recompressed data. When it is determined that the data pointed to by the same fingerprints is included in the original data group of the recompressed data, the processing proceeds to the processing of step S54, and otherwise, the processing proceeds to the processing of step S55.

In addition, it is determined whether the data indicated by the fingerprints is included in the original data group of the recompressed data, by referring to the table T2 illustrated in FIG. 8. When a fingerprint is used as identification information of data, the search may be performed using the fingerprint as a key.

Alternatively, when a fingerprint is not used as identification information of data, it is assumed that a fingerprint and identification information are associated with each other, and the search is performed using the identification information associated with the fingerprint as a key.

(Step S54) The controller 10a does not deduplicate the target data (the data to be written) but processes the target data as new data.

In addition, the newly written data is highly likely to be accessed soon. Thus, when the data included in the original data group of the recompressed data is processed as data to be deduplicated, the processing costs for a subsequent access increases.

Therefore, with respect to data whose calculated fingerprint does not exist in the fingerprint pool Pf and data whose calculated fingerprint exists in the fingerprint pool Pf and which is included in the original data group of the recompressed data, the target data is not deduplicated but is processed as new data (non-deduplication data).

(Step S55) With respect to data whose calculated fingerprint exists in the fingerprint pool Pf and which is not included in the original data group of the recompressed data, the controller 10a deduplicates the target data (processes the target data as duplicate data).

<Operation in Case Where among Original Data Group of Recompressed Data, Number of Pieces of Original Data Whose Reference Count is 0 is Equal to or More Than Predetermined Number>

Figure 14:
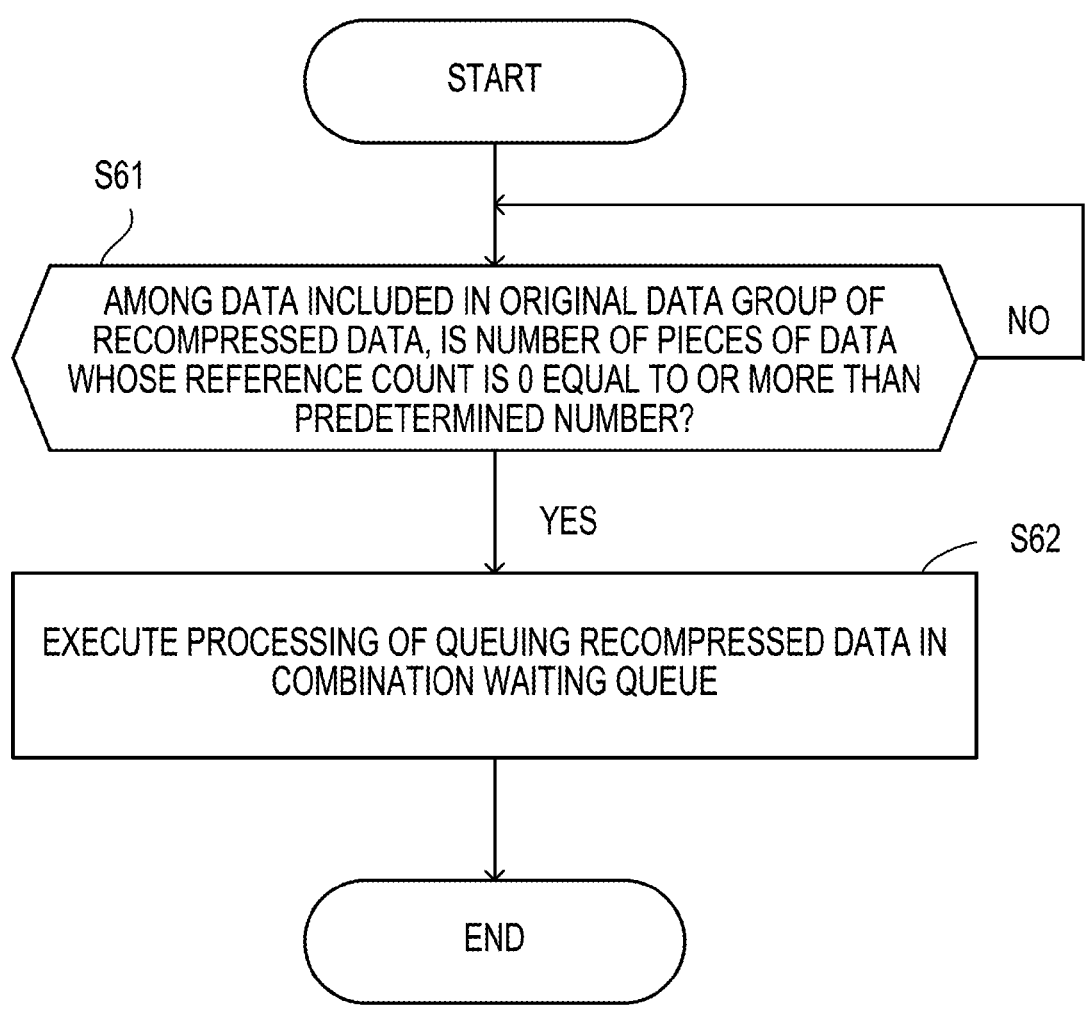
FIG. 14 is a flowchart illustrating an operation in a case where, among an original data group of recompressed data, the number of pieces of original data whose reference count is 0 is equal to or more than a predetermined number.

FIG. 14 is a flowchart illustrating an operation in a case where among the original data group of the recompressed data, the number of pieces of original data whose reference count is 0 is equal to or more than a predetermined number. In addition, for example, when overwriting on an LBA of a copy destination volume occurs or a deletion of a snapshot to which data belongs occurs, the reference count may become 0.

(Step S61) The controller 10a determines whether, among the original data group of the recompressed data, the number of pieces of original data whose reference count is 0 is equal to or more than a predetermined number. When it is determined that the number of pieces of original data whose reference count is 0 is less than the predetermined number, the processing returns to step S61 to perform a next determination, and when it is determined that the number of pieces of original data whose reference count is 0 is equal to or more than the predetermined number, the processing proceeds to step S62. In addition, the determination in step S61 is periodically performed using, for example, a periodical timer.

(Step S62) When it is determined that among the original data included in the original data group of the recompressed data, the number of pieces of original data whose reference count is 0 is equal to or more than the predetermined number, the controller 10a queues the recompressed data in the combination waiting queue.

That is, the recompressed data including the original data whose reference count is 0 in the original data group is not immediately decompressed but is queued until the original data whose reference count is 0 reaches the predetermined number or more. At this time, actually, the data is not queued, but only the data ID of the recompressed data is queued.

<Operation When Combination Waiting Queue Is Dequeued>

Figure 15:
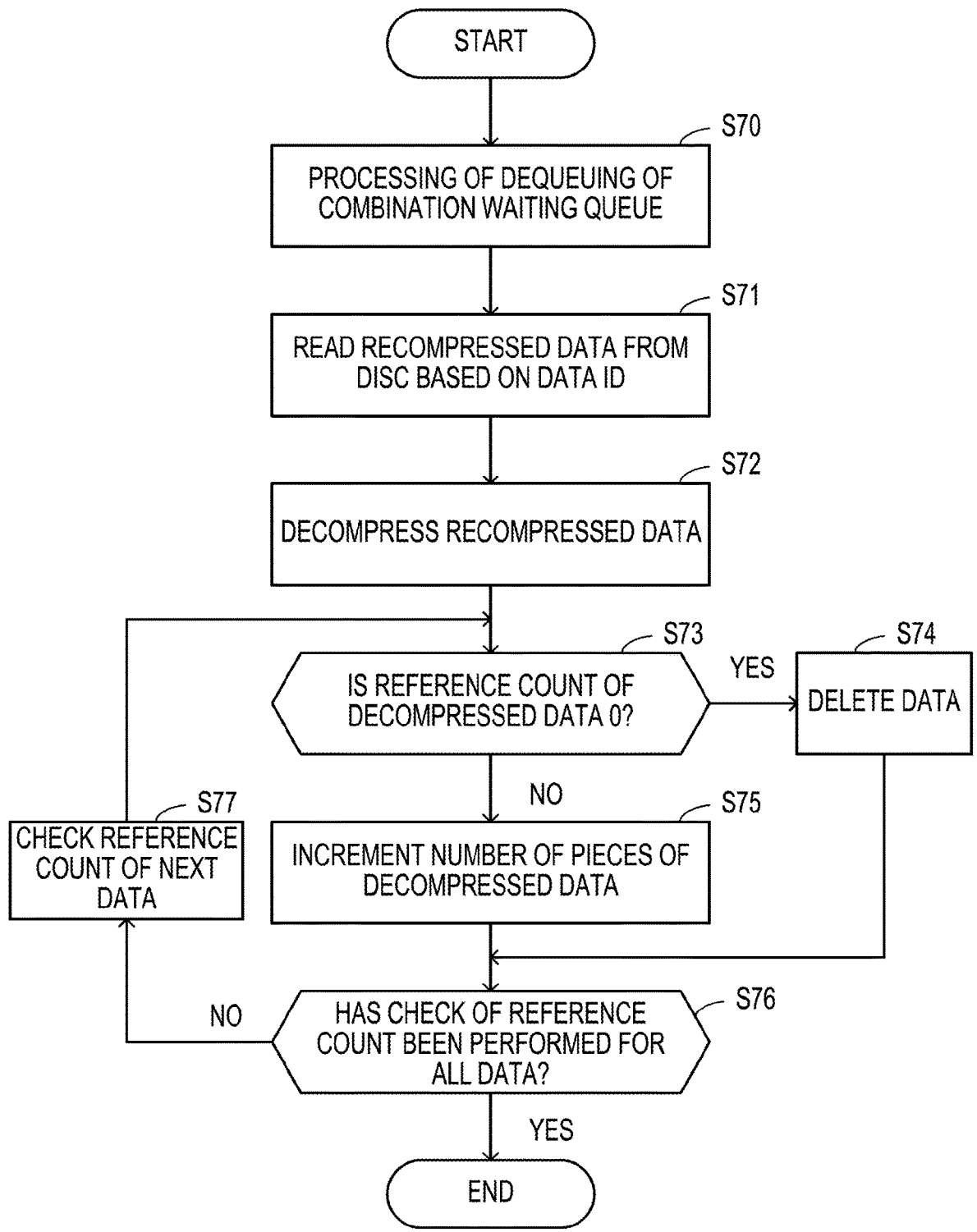
FIG. 15 is a flowchart illustrating an operation when a combination waiting queue is dequeued.

FIG. 15 is a flowchart illustrating an operation when the combination waiting queue is dequeued.

(Step S70) The controller 10a dequeues the data ID queued in the combination waiting queue.

(Step S71) The controller 10a reads the recompressed data from the memory device 2 based on the data ID of the table T3 of the mapping data illustrated in FIG. 10.

(Step S72) The controller 10a decompresses the read recompressed data.

(Step S73) The controller 10a determines the reference count of the decompressed data as a response in a case where a change occurs. When it is determined that the reference count is 0, the processing proceeds to step S74, and when it is determined that the reference count is not 0, the processing proceeds to step S75.

(Step S74) The controller 10a deletes the data whose reference count is 0, from the decompressed data. The processing proceeds to step S76.

(Step S75) The controller 10a regards the data whose reference count is not 0, among the decompressed data, as data to be combined, and increments the number of the pieces of decompressed data. The recompression is performed according to whether the number of the pieces of decompressed data is equal to or more than a predetermined number (equivalent to the predetermined number described in step S27 of FIG. 7).

(Step S76) The controller 10a determines whether the reference count has been determined for all of the pieces of decompressed data. When it is determined that the reference count has been determined for all of the pieces of decompressed data, the processing is ended, and when it is determined that there exists undetermined data, the processing proceeds to step S77.

(Step S77) The controller 10a determines the reference count of next data. The processing returns to step S73.

As described above, according to the present disclosure, with respect to the old snapshots when a predetermined number of generations have elapsed, pieces of data, excluding data that has been recently accessed and data pointed from other LBAs by the deduplication logic, are collected, and the respective pieces of data are decompressed, and then, recompressed into a single piece of data.

As a result, since the unit of the compression may be increased, a relatively higher compression rate may be expected, so that a reduction of a relatively larger storage capacity may be implemented. Further, even when a snapshot is created for several generations, for example, a processing of deleting middle generations or increasing the interval for creating the snapshot is unnecessary, so that snapshots of relatively more generations may be created.

The processing functions of the storage control apparatus 1 and the server 10 according to the present disclosure described above may be implemented by a computer. In this case, programs describing the processing contents of the functions that need to be equipped in the storage control apparatus 1 and the server 10 are provided. By executing the programs with the computer, the processing functions are implemented on the computer.

The programs describing the processing contents may be recorded in a computer readable recording medium. The computer readable recording medium is, for example, a magnetic memory device, an optical disc, a magneto-optical recording medium or a semiconductor memory. The magnetic memory device is, for example, an HDD, a flexible disk (FD) or a magnetic tape. The optical disc is, for example, a CD-ROM/RW. The magneto-optical recording medium is, for example, a magneto-optical disc.

When the programs are distributed, for example, a portable recording medium such as a CD-ROM in which the programs are recorded is sold. In addition, the programs may be stored in a memory device of a server computer, and may be transferred from the server computer to another computer via a network.

The computer that executes the programs stores the programs recorded in the portable recording medium or the programs transferred from the server computer, in its own memory device. Then, the computer reads the programs from its own memory device and executes the processing according to the programs. In addition, the computer may read the programs directly from the portable recording medium and execute the processing according to the programs.

In addition, each time a program is transferred from the server computer connected via a network, the computer may sequentially execute the processing according to the received program. In addition, at least a portion of the processing functions described above may be implemented by an electronic circuit such as DSP, ASIC or PLD.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage control apparatus comprising:
a memory; and
a processor coupled to the memory and the processor configured to:
create a snapshot of a first volume of a storage device;
update at least a part of the first volume of the storage device;
deduplicate unupdated data among data of the first volume;
compress the deduplicated data to create compressed data;
store the compressed data in a second volume of the storage device;
select, when the snapshot is created for two or more generations, the second volume that corresponds to each of a plurality of snapshots that is created before a predetermined generation among the two or more generations;
detect specific data from the compressed data that exists in the selected second volume based on a reference count of the compressed data, the reference count being a number of references to the compressed data made from logical addresses of the selected second volume and created as a result of the deduplication;
collect and decompress detected pieces of the specific data when a number of the detected pieces of the specific data is equal to or more than a predetermined threshold value; and
combine and recompress the decompressed data to create recompressed data.

2. The storage control apparatus according to claim 1, wherein the processor is configured to determine the compressed data whose reference count is 1 as the specific data.

3. The storage control apparatus according to claim 1, wherein the processor is configured to determine the compressed data whose reference count is 2 or more as data other than the specific data.

4. The storage control apparatus according to claim 1, wherein the processor is configured to:
receive a read request for reading first data included in a data group combined in the creation of the recompressed data;
decompress the first data to create second data upon receiving the read request;
transfer the second data in response to the read request;
hold the second data in the memory for a predetermined time; and
discard the second data from the memory in absence of an access to the second data within the predetermined time.

5. The storage control apparatus according to claim 1, wherein the processor is configured to:
receive a write request for writing second data; and
write the second data in the storage device as new data without performing the deduplication upon detecting that the second data overlaps with first data included in a data group combined in the creation of the recompressed data.

6. The storage control apparatus according to claim 1, wherein the processor is configured to:
delete, upon detecting that a number of pieces of data whose reference count is 0 is equal to or more than a predetermined threshold value among data included in a data group combined in the creation of the recompressed data, the data whose reference count is 0 from the data group obtained by decompressing the recompressed data; and combine the data group after the deletion to recompress the combined data group.

7. The storage control apparatus according to claim 1, wherein the processor is configured to create metadata including an association relationship between the logical addresses and identification information for identifying the compressed data, and an association relationship between the identification information and a storage destination of the compressed data.

8. A non-transitory computer-readable recording medium having stored therein a program that causes a computer to execute a process, the process comprising:

creating a snapshot of a first volume of a storage device;

updating at least a part of the first volume of the storage device;

deduplicating unupdated data among data of the first volume;

compressing the deduplicated data to create compressed data;

storing the compressed data in a second volume of the storage device;

selecting, when the snapshot is created for two or more generations, the second volume that corresponds to each of a plurality of snapshots that is created before a predetermined generation among the two or more generations;

detecting specific data from the compressed data that exists in the selected second volume based on a reference count of the compressed data, the reference count being a number of references to the compressed data made from logical addresses of the selected second volume and created as a result of the deduplication;

collecting and decompressing detected pieces of the specific data when a number of the detected pieces of the specific data is equal to or more than a predetermined threshold value; and combining and recompressing the decompressed data to create recompressed data.

* * * * *